Dec. 14, 1937.  T. ZUSCHLAG  2,102,452
DETECTION OF FLAWS IN MAGNETIZABLE BODIES
Filed April 23, 1936
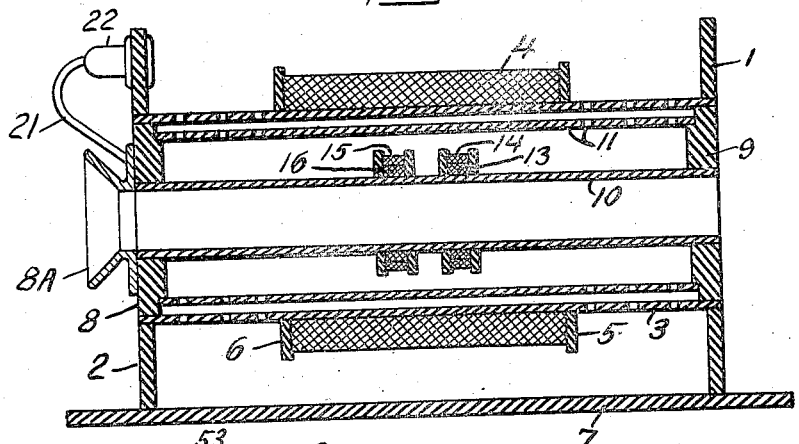
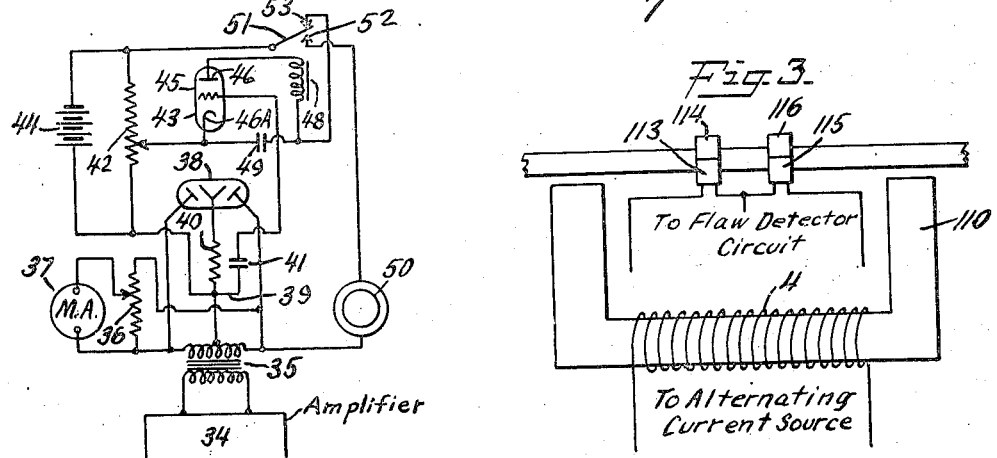
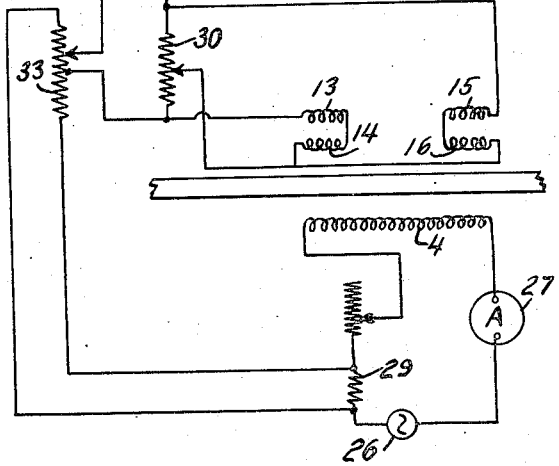
INVENTOR
*Theodor Zuschlag*
BY
*Pennie, Davis, Marvin and Edmonds*
ATTORNEYS Patented Dec. 14, 1937

2,102,452

UNITED STATES PATENT OFFICE

2,102,452

DETECTION OF FLAWS IN MAGNETIZABLE BODIES

Theodor Zuschlag, West Englewood, N. J., assignor to Magnetic Analysis Corporation, a corporation of New York Application April 23, 1936, Serial No. 75,944

9 Claims. (Cl. 175—183)

This invention relates to magnetic analysis and is concerned particularly with the detection of flaws in magnetizable bodies such as steel bars, tubes, cables and the like. The invention contemplates the provision of a novel apparatus whereby the presence of flaws in magnetizable bodies is detected even when such flaws remain in inductive relationship with the detection means for very short periods of time. The apparatus is therefore adapted to high speed testing, and will indicate the presence of flaws even when magnetizable bodies are passed through the apparatus at speeds as high as 200 feet per minute.

Briefly, the apparatus comprises an exciter coil adapted to be energized by alternating current, a plurality of pairs of secondary coils disposed in inductive relationship with the exciter coil and connected with each other in a bridge network, and means for detecting the presence of an alternating current potential induced in the bridge network. The secondary coils are so arranged that one pair is disposed in each of the two outer legs of the bridge network, the coils in each leg being connected in series opposition with each other, with one secondary coil of the pair being disposed nearer to the exciter coil than the other secondary coil of the pair. In other words, one coil of each pair is adapted to be disposed nearer to the magnetizable body being investigated than is the other coil of the pair. Means are provided for indicating the presence of a potential induced in the network.

The apparatus preferably is also provided with means for amplifying a potential induced in the bridge network to facilitate its detection, and means for prolonging the indication of any potential thus detected.

In a preferred form of the apparatus, means are also provided for varying the resistance in the legs of the bridge network containing the secondary coils, and means may also be provided for introducing primary alternating current into the bridge network for compensation purposes.

The apparatus will be more thoroughly understood in the light of the following detailed description, taken in conjunction with the accompanying drawing in which Fig. 1 is a schematic representation of a test coil assembly containing the special flaw detector secondary coils of my invention;

Fig. 2 is a wiring diagram of the apparatus of my invention including the test coil assembly;

Fig. 3 is a schematic representation of a test coil assembly adapted especially for testing cables and similar elongated bodies for broken strands or other flaws; and Fig. 4 is an elevation of the secondary coils of Fig. 3.

The test coil assembly

The test coil assembly shown in Fig. 1 comprises a pair of non-conducting end plates 1 and 2 into which is rigidly fitted a perforated barrel 3 of "bakelite" or other non-conducting material, around the middle of which is wound a primary or exciter coil 4 which is held in place by a pair of end rings 5 and 6. The end plates are fastened onto a horizontal base plate 7 preferably made of non-conducting material.

Within the barrel, so that it may be removed if necessary is a secondary coil assembly which comprises a pair of annular non-conducting ends 8 and 9 whose outside diameter is such that they fit loosely into the barrel. The annular ends are fastened together on their insides by a second non-conducting barrel 10 and at their outside by a third non-conducting barrel 11 which is also perforated. The perforations in barrels 3 and 11 permit ventilation and heat dissipation within the secondary coil assembly.

A funnel-shaped metal guide 8A is fastened to the outside of one of the annular ends of the secondary coil assembly to facilitate the entrance of specimens into the barrel 10, and to protect the end of the test coil assembly.

Secondary coils are wound around the inside barrel 10 of the secondary coil assembly as follows:

On either side of the center of the test coil assembly, and well within the primary test coil, are a pair of "flaw" coils, numbered respectively 13, 14 and 15, 16. The four flaw coils are substantially identical and of low ohmic resistance. Each pair of "flaw" coils is so wound that one of the pair is nearer to the inside barrel 10 than the other of the pair, for reasons which will be set forth hereinafter.

The end connections of the secondary coils on the barrel 10 are carried through a loom 21 passing through one end of the secondary coil assembly and fastened to a multiprong plug 22 through which the connections are completed to other portions of the apparatus as shown in the wiring diagram (Fig. 2).

All of the coils in the test coil assembly are wound with insulated wire of low ohmic resistance.

The barrels, spools, end plates, etc., of the test coil assembly are made of "bakelite", or similar non-conducting material.

As hereinbefore indicated the secondary coil assembly may be removed from the barrel upon which the primary coil is wound, and replaced by another having a barrel 10 of different diameter. In this way the test coil assembly may be changed to accommodate various sizes of magnetizable material. The overall size of the test coil assembly, will depend, of course, upon the size of the material to be tested. Ordinarily the test coil assembly will be about two feet long, and the primary coil will have a superficial length of one foot or less.

The various connections and functions of the individual coils in the test coil assembly which has just been described may be seen in Fig. 2, to which reference should now be made.

The primary test coil 4 is connected in series with an alternating current source 26, preferably of constant potential and frequency, through an ammeter 27, an adjustable resistor 28 and a fixed resistor 29. Any suitable alternating current source may be used, but I prefer to employ a synchronous motor-generator set (not shown) with the motor connected to a commercial power line, and the generator connected to the primary test coil. In this way an electric current of substantially constant voltage and frequency is obtained, line variations and surges being largely eliminated. In operation there is a potential of about 110 volts across the generator, and the current in the primary test coil varies from 8 to 10 amperes depending upon the size of the material being examined. The synchronous motor generator set preferably operates at the commercial frequency, say 60 cycles, although current of any frequency may be employed. The output of the generator should be single phase.

*The flaw detector circuit*

The flaw detector circuit of the apparatus depends upon the E. M. F. induced in the two pairs of flaw detection coils 13, 14 and 15, 16 which are disposed in inductive relationship with the primary test coil. The two coils of each pair of flaw detection coils are connected in series opposition with each other. Because of the arrangement described previously one coil of each pair is located closer to the inside barrel 10 and to the material to be tested than the other coil of the pair. Preferably the inner coil of each pair of flow detection coils is wound counterclockwise and the outer coils of each coil clockwise (or vice versa) in order to facilitate the connection of the coils of each pair in series opposition. The two pairs of coils are connected in opposition to each other in a bridge circuit containing a secondary potentiometer 30 provided with a slider. As may be seen in Fig. 2, each side of the bridge contains an end of the potentiometer and one pair of flow detection coils, while the slider of the potentiometer is connected to the common leg of the bridge. The coil arrangement just described is effective in minimizing the electro-magnetic effects induced by the strain variations in cross-section etc. of the specimens being investigated, thus emphasizing the electromagnetic effects induced in the two pairs of coils due to the presence of flaws in the specimens.

The ends of the secondary potentiometer 30, are connected to the primary coil of an amplifier input transformer 31.

To permit the introduction of primary potential from the current source into the flaw detection circuit for compensation purposes a center tap potentiometer 33 is connected with its center tap and slider in series with the ends of the secondary potentiometer and the ends of the primary coil of the amplifier input transformer. The ends of this center tap potentiometer are connected to both sides of the fixed resistor 29 in the primary circuit. If the flaw detector coils were each exactly alike, and each pair were disposed in exactly the same inductive relationship with the primary coil; and if further stray inductive effects did not influence the flaw detection circuit, the imposition of a primary potential across this circuit would not be necessary, and the center tap potentiometer could be eliminated. In practice, however, such ideal conditions are seldom met, hence the provision of this compensation means in the instant apparatus.

Referring again to Fig. 2, it will be seen that the secondary coil of the amplifier input transformer is connected to an amplifier 34, which in turn is connected to the primary coil of an amplifier output transformer 35. In this way the relatively feeble impulses which originate in the flaw detection coils are magnified so as to be more easily observed. Any suitable type of amplifier may be employed.

The secondary coil of the amplifier output transformer has a center tap. The ends of this secondary coil are connected in series with the ends of a sensitivity control potentiometer 36. The slider of this potentiometer is connected in series to one of the ends of this potentiometer through a rectifier type microammeter 37.

The ends of the secondary of the output transformer are also connected to the plates of a diode rectifier 38 and the cathode of this diode rectifier is connected to the center tap of the secondary of the output transformer through a grid resistance condenser combination 39. This grid resistance condenser combination comprises a resistance 40 shunted by a condenser 41.

The side of the grid resistance condenser combination which is connected to the center of the secondary coil of the output transformer is also connected to an end of a potentiometer 42 and through the slider of this potentiometer to the cathode of a grid-controlled gas tube 43. The ends of potentiometer 42 are connected to a battery 44 or other direct current source. The negative side of the direct current source is connected to that end of the potentiometer 42 which is also connected directly to the grid resistance-condenser combination. The grid 45 of the grid-controlled tube is connected to the end of the grid resistance condenser combination nearest to the diode rectifier. The plate 46 of the grid-controlled tube is connected to the cathode 46A of the tube through the coil of a relay controlled switch 48 and through a condenser 49.

The flaw detector circuit is completed by a lead connected to the end of potentiometer 42 remote from the grid resistance condenser combination and to an end of the secondary coil of the output transformer in series with a neon flash light 50 through switch arm 51 and contact point 52 of the double throw relay controlled switch. The other contact point 53 of said relay controlled switch is connected into the circuit between the relay coil 48 and the condenser 49.

The operation of the flaw detector may be described as follows:

A magnetic field which permeates a magnetizable body is subject to distortion by the presence of flaws in the body and by the presence of internal strains. However, both internal and surface strains, particularly those caused by heat treatment or by mechanical working, generally cause so-called "longitudinal" distortions of the magnetic field whereas flaws are generally manifested by "transverse" distortion in the field. In other words, if the major axis of the field coincides with the major axis of the steel bar, or other elongated magnetizable body, variations in strain are chiefly noted in a plane parallel to the longitudinal or major axis of the field, whereas flaws are manifested by field distortions observed in a plane at right angles to this axis.

In order to detect flaws in a specimen it is therefore desirable to observe "transverse" distortions in the magnetic field without interference from the "longitudinal" distortions, or in other words, to detect deviations from the normal character of the transverse cross-section of a magnetic field surrounding a magnetic specimen, at the same time eliminating or reducing manifestations caused by deviations in the normal character of a longitudinal cross-section of the field.

This result may be produced with the arrangement of flaw detector coils (13, 14, 15, 16) illustrated in Fig. 2. When an alternating current is passed through a primary coil disposed in inductive relationship with an elongated magnetizable body, and when the flaw detector coils are placed in the field thus created, a substantial electromotive force appears in a bridge circuit connected with the flaw detection coils only when there is a flaw in the body. The explanation of this phenomenon appears to be as follows:

One coil of each pair is disposed nearer to the magnetizable body than is the other coil of this pair; the coils of each pair are connected to each other in series opposition and are wound opposite to each other, and the two pairs are opposed to each other in a bridge circuit. Because of the direction of winding on the coils and their connections with each other the circuit is substantially non-inductive, and deviations from the normal longitudinal section of the magnetic field will produce practically no resultant E. M. F. in the circuit connected to coils 13, 14, 15 and 16. Therefore strain conditions in the magnetizable body are not indicated.

On the other hand, the presence of a flaw in the body produces an entirely different set of electrical and magnetic conditions. A flaw is seldom uniform, and will almost invariably set up a distortion in a plane of the field at right angles to the major axis of the field. As the body is moved through the field the plane in which the distortion appears passes under one pair of flaw detector coils. This induces an unbalanced electrical condition between the two pairs of coils. Assuming that the plane in which the distortion occurs passes through coil pair 13, 14, the coil 13, which is nearest the magnetizable body will have an E. M. F. induced in it which is different from the E. M. F. in the other coil 14. There will therefore be a resultant E. M. F. in this coil pair which is different from the resultant E. M. F. in the other pair of coils (15, 16) which is more remote from the transverse plane in which the field distortion caused by the flaw is manifested. Consequently an E. M. F. will be imposed across the bridge circuit which connects the two pairs of coils. An indicating instrument placed in this bridge circuit will show the presence of a flaw in the body by detecting the presence of an electromotive force in the circuit.

If the flaw detection coils were physically and electrically identical and were disposed in exact concentric relationship with the primary coil, the bridge circuit would always be in balance except when a flaw was present in the inductively associated specimen. In practice, such an ideal condition is seldom encountered. Consequently, I have provided the potentiometers 30 and 33. The potentiometer 30 may be employed to vary the resistances of the two sides of the bridge circuit, and the potentiometer 33 may be employed to introduce a regulated primary electromotive force into the bridge circuit if the resistance regulation permitted by the potentiometer 30 is insufficient to balance the bridge circuit when a specimen which is known to be free from flaws is inserted in the test coil assembly.

For slow speed flaw detection any alternating current indicating device which is sufficiently sensitive may be connected across the bridge circuit, or a suitable amplifier may be connected across the bridge circuit with the alternating potential indicator connected to its output side. Thus, in slow speed testing, the amplifier 34, connected across the bridge circuit through the input transformer 31 and connected to the microammeter 37 through the amplifier output transformer 35, is adequate. The presence of a flaw in a specimen is manifested by a sufficiently prolonged deflection of the needle of the microammeter.

Cracks, seams and slivers in bar stock and pin holes, slag segregations and imperfectly welded sections in butt-welded tubing can be detected with the microammeter type of indicator provided with suitable amplifying means at slow test speeds, say with specimens moving through the test coil assembly at speeds ranging from 10 to 20 feet per minute. These speeds are uneconomical however, when large amounts of material must be tested. Test speeds from 100 to 200 feet per minute are to be preferred.

When the specimen moves through the test coil assembly at such high speeds, simple indicating means such as a microammeter are inadequate. Even the most sensitive types of microammeters are too sluggish to indicate the presence of a current which endures for only a short space of time, in some cases for only a hundredth of a second, and even if a proper indication were given by the microammeter, the operator might fail to note it.

An oscillographic indicator of the galvanometer or cathode ray type is fast enough to note a momentary deviation of the type undergoing consideration, but is frequently unsatisfactory for one or more of the following reasons:

(1) Because the deflections of the instrument are so sharp and short as to escape observation by any but the keenest of operators, a type not often available for ordinary commercial work, and (2) Because eye strain results from attempting to observe such sharp deflections, and (3) Because the oscillographic instruments are not sufficiently rugged for commercial testing and are subject to much repair.

To prolong the duration of flaw indications in high speed test work I employ the hereinbefore described grid controlled gas tube combination in conjunction with a neon signal light. The function of this portion of my apparatus is best described with reference to Fig. 2.

As previously indicated, the two transformers 31 and 35 are employed simply to furnish a convenient means for connecting the amplifier 34 in the circuit. The current in the secondary coil in the output transformer is subject to the same fluctuations as the current in the primary coil of the input transformer, but its magnitude has been substantially amplified.

The amplified output of the transformer is imposed across the alternating current rectifier type microammeter 37 through the potentiometer 36, the function of which is to control the amount of deflection which a given impulse will cause in the microammeter. In slow speed testing the magnitude of the deflection of the microammeter may be taken as an indication of the size of any flaw that is encountered, but the chief function of the microammeter is to permit a proper adjustment of the circuit for "no-flaw" conditions, i. e., a standard specimen which is known to be flawless is placed in the test coil assembly and potentiometers 30 and 33 are adjusted until no deflection takes place at the microammeter.

Now proceeding with a consideration of the special means employed for prolonging and emphasizing the indication of a flaw in high speed testing, it will be seen that the condenser 49 will normally be charged to the limit of the voltage of the direct current source 44 with which it is connected through the potentiometer 42 and the upper pole 53 of the relay-controlled switch. The condenser remains charged as long as the grid-controlled tube remains nonconducting, i. e., as long as the grid bias of this tube is sufficiently high. But when a flaw is present in a specimen within the test coil assembly, an alternating current is induced in the secondary coil of the output transformer, and imposed across the diode rectifier resulting in an unidirectional current flowing through the grid resistor-condenser combination 39 from the cathode of the diode rectifier 38 to the center tap of the secondary of the output transformer 35. This sets up a potential difference across the grid resistor, and tends to result in a direct current flow through the cathode and the grid of the grid-controlled tube 43. Actually, this results in decreasing the grid bias, so that the condenser discharges through the grid-controlled tube. The resultant current flow from the condenser to the plate of the grid controlled tube then energizes the coil of the relay and moves the associated switch arm 51 so that the direct current from the source can pass through the neon tube, causing it to flash. The neon tube will continue to flash as long as the condenser is discharging. When the condenser is discharged, no current passes through the relay coil and the switch arm returns to its normal position, so that a charge may again be built up in the condenser 49 by the direct current source 44.

The presence of the rectifier in the circuit is made desirable by the fact that a defect may be completely manifested during a half cycle of the alternating current. If this half cycle should be of improper sign, it would increase the grid bias instead of decreasing it; the grid-controlled tube would not fire, and the flaw in the sample would pass unnoticed. With the rectifier in the circuit any current flaw in the secondary of the output transformer must result in a decrease in the grid bias, so that flaws will be shown infallibly at all times. Of course, if a flaw is sufficiently prolonged as to affect more than a half cycle of the alternating current, it would inevitably result in decreasing the grid bias of the tube, but in high speed testing such prolonged manifestation of a flaw is not always encountered. I therefore recommend the use of the rectifier.

The potentiometer 42 is inserted between the direct current source 44 and the condenser 49 so that the grid bias of the grid controlled tube 43 may be varied.

*Cable testing*

In the testing of elevator cables and the like the chief problem is the determination of broken strands. Such broken strands frequently occur within the cable and present hazards in hoisting without being visible.

Moreover, it is frequently inconvenient to pass a long length of cable through a test coil assembly of the type illustrated in Fig. 1, for the reason that the ends may not be free.

Consequently I have devised a special test coil assembly for cable testing which may be used in connection with the flaw detector circuit of my invention.

The special test coil assembly for cable inspection is illustrated in Fig. 3. It comprises an exciter coil 4 similar in construction and electrical characteristics to the exciter coil of Fig. 1, but wound about a horseshoe yoke 110 of laminated iron of low hysteresis. Between the two legs of the magnet are placed four flaw detection coils 113, 114, 115, 116.

The construction of the flaw detector coils 113, 114, 115 and 116, is shown in Fig. 4 which illustrates one pair of coils in elevation. Thus coils 113 and 114 are both crescent shaped so that together they substantially surround the section of cable being tested. The leads are brought into the outer portion of coil 113, which is connected to coil 114 by two leads at one of the two points where the two crescents meet. As shown, this system of windings and connections is such that the flow of current on the inside of the crescents is always opposite to that on the outside of the crescents. In other words, the flow of current on the inner turns of the coils is clockwise when the flow in the outer turns of the coils is counter-clockwise and vice versa.

This type of coil construction is convenient for cable testing because the upper crescent shaped coil may be removed easily to permit the insertion of the cable which is to be tested. To do so it is only necessary to disconnect the two leads which connect the coil 114 to the coil 113.

At the same time, this type of coil assembly behaves in the same way as the "flaw" coils 13, 14, 15 and 16 in Fig. 2. The inner portions of the crescent shaped coils have a current flow opposite in direction to the current flow in the outer portions of the coils and are located nearer to the magnetizable body, hence they function in the same way as the flaw coils shown in Fig. 2.

If desired, the upper coil of each pair may be removed, in which case the winding on the lower coil is made continuous by connecting together the two leads which were formerly connected to the upper coil. The single lower coil will function as a pair, but if a flaw occurs in the portion of the cable lying above the lower coil its presence will be more difficult to detect. I prefer, therefore, to operate with the flaw coils surrounding the cable.

The exciter coil of Fig. 3 is connected to the alternating current source in the same manner as the exciter coil of Figs. 1 and 2. The flaw detection coils of Fig. 3 are connected to the flaw detection circuit in the same manner as the flaw detection coils in Figs. 1 and 2. In other words, the test coil assembly of Fig. 3 operates in conjunction with the flaw detector circuit and the test coil energizing means shown in Fig. 2.

The cable, however, instead of being passed through the exciter coil of Fig. 1, passes across the legs of the magnet and is thus subjected to an electromagnetic flux. The presence of a flaw in the cable affects the flux and sets up an unbalanced electrical condition in the flaw detector coils which is amplified and indicated by the meter 37 or the neon light 50 of the flaw detection circuit.

I claim:

1. In a magnetic analysis apparatus the combination which comprises an exciter coil, means for supplying alternating current to the exciter coil, two pairs of secondary coils disposed in inductive relationship with the exciter coil, one coil of each pair being disposed closer to the exciter coil than the other coil of the pair, a bridge network in which the coils of each pair are connected in series opposition with each other and the pairs are also connected in series opposition with each other, and means for detecting the presence of a potential in said network.

2. Apparatus in accordance with claim 1, provided with means whereby current from the alternating current source may be introduced directly into the bridge network.

3. Apparatus according to claim 1 provided with a potentiometer connected in the bridge network.

4. Apparatus according to claim 1 provided with means for prolonging the indication of a potential in the bridge network.

5. Apparatus for detecting the presence of flaws in a magnetizable body which comprises an exciter coil adapted to be placed in inductive relationship with the magnetizable body, means for energizing the exciter coil with alternating current, a bridge network having a pair of secondary coils and an adjustable resistance in each of two legs, the coils of each pair being connected in series opposition with each other and disposed in inductive relationship with the exciter coil in such fashion that one coil of each pair is located nearer the exciter coil, and means for indicating a potential in the bridge network.

6. Apparatus in accordance with claim 5 provided with means for amplifying a potential induced in the bridge network, means for rectifying said potential, and means for prolonging the indication of a potential thus rectified.

7. Apparatus in accordance with claim 5 provided with means for rectifying a potential produced by the bridge network, a direct current source, a glow tube connected therewith, and means whereby the rectified potential causes a flow of current from the direct current source through the glow tube.

8. Apparatus according to claim 5 provided with means for amplifying a potential produced in the bridge network, a glow tube, and means for energizing the glow tube when a potential is present in the bridge network.

9. Apparatus according to claim 5 provided with a glow tube, means for energizing the glow tube when a potential is induced in the bridge network, and means for prolonging the energization of the glow tube.

THEODOR ZUSCHLAG.